United States Patent [19]

Kovalsky

[11] Patent Number: 4,523,952

[45] Date of Patent: Jun. 18, 1985

[54] MANUFACTURE OF PRINTING INKS

[75] Inventor: Stephen J. Kovalsky, Indian Head Park, Ill.

[73] Assignee: Sun Chemical Corporation, New York, N.Y.

[21] Appl. No.: 575,178

[22] Filed: Jan. 30, 1984

[51] Int. Cl.³ .............................................. C09D 11/02
[52] U.S. Cl. ...................................... 106/20; 106/307
[58] Field of Search ................................... 106/307, 20

[56] References Cited

U.S. PATENT DOCUMENTS 3,199,991  8/1965  Schelling et al. ..................... 106/32
3,959,008  5/1976  Warner et al. ....................... 106/307
3,988,478 10/1976  Wiggins ............................... 106/307

Primary Examiner—Paul Lieberman
Assistant Examiner—Amelia B. Yarbrough
Attorney, Agent, or Firm—Cynthia Berlow

[57] ABSTRACT

Inks are manufactured directly from residues from refinery operations by the steps of (1) charging the residue feedstock into a chamber where (a) it is atomized and (b) its decomposition products are reacted with oxygen and heat, (2) discharging the products of step (1) into a mixing device containing a liquid ink vehicle and selected additives, and (3) recovering the ink product.

12 Claims, 2 Drawing Figures

MANUFACTURE OF PRINTING INKS

This invention relates to printing inks. More particularly, it relates to printing inks that are manufactured directly from residues from refinery operations.

BACKGROUND OF THE INVENTION

Newspapers are generally printed with inks that are prepared by mechanically dispersing carbon black in mineral oil (U.S. Pat. Nos. 3,199,991 and 3,330,673). The required smooth dispersion of carbon black in the ink oil is usually produced by intensively grinding the materials together in a suitable mill, such as a ball mill.

The preferred carbons for use in printing inks are finely-divided pellet, or bead, grade. In commerce, carbon pellets are manufactured by the following process: residual liquid hydrocarbon feedstock (oils or tars obtained from refinery operations) is charged into a refractory chamber which is maintained at red heat (about 2400° to about 2900° F.) by an ancillary burner usually fueled by gas. The residual liquid is atomized with steam in the refractory area where primary pyrolysis occurs, and secondary pyrolysis continues as the decomposition products react with oxygen that is carefully metered into the reactor as air. The reaction is then quenched to below the reaction temperature of the air-gas mixture by dropping the gas temperature, e.g., with sprays of water. The resulting fluffy carbon is then separated from the gas stream, compacted, pelletized, dried, and recovered as the carbon pellet product. A great deal of heat and combustible gases are by-products of the operation.

The carbon pellet is then transported to a printing ink manufacturing facility where it is added, along with ink vehicles, to a grinding device, such as a ball mill, to produce a smooth dispersion.

A typical carbon black reactor (as shown in FIG. 1) is about two feet in diameter and about 30 to 45 feet long. Other designs, with diameter to height ratios approaching 1:1, are also in use.

BRIEF DESCRIPTION OF THE INVENTION

A direct process for producing printing inks from a hydrocarbon residue feedstock comprises the steps of (1) charging the feedstock into a chamber where (a) it is atomized and (b) its decomposition products are reacted with oxygen and heat, (2) discharging the products of step (1) into a mixing device containing a liquid ink vehicle and additives, and (3) recovering the ink product.

DETAILED DESCRIPTION OF THE INVENTION

Figure 1:
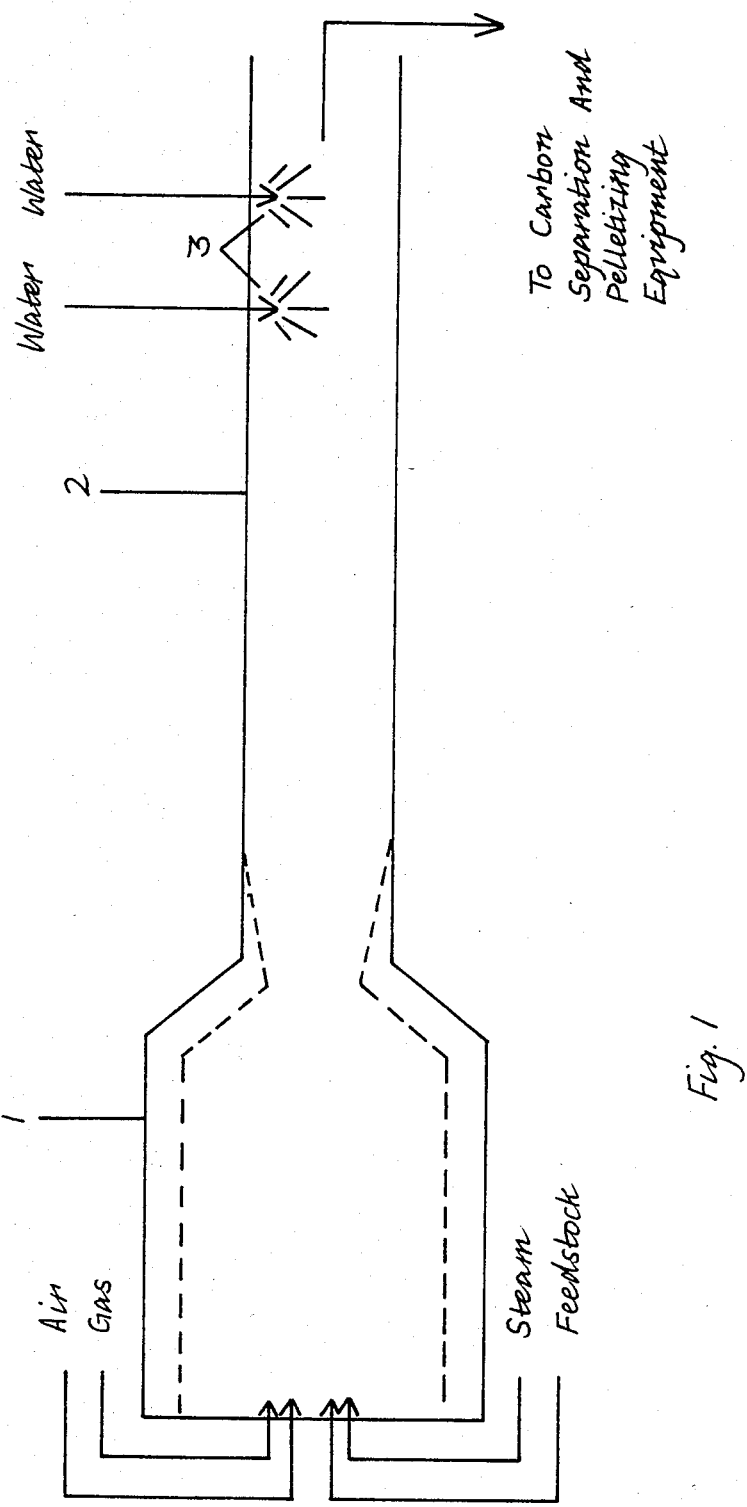
FIG. 1 is a diagram illustrating a typical reactor for making carbon.
Figure 2:
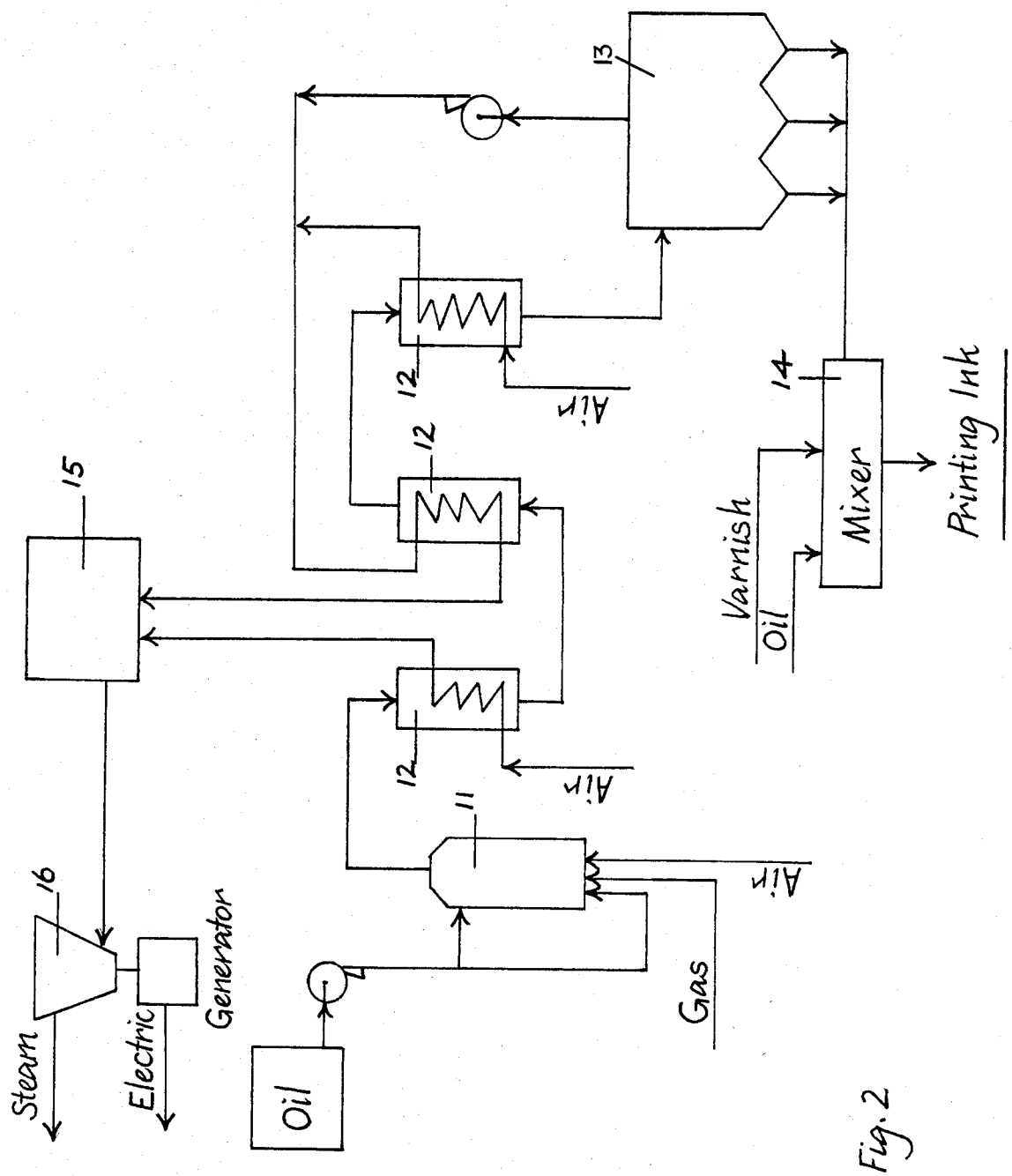
FIG. 2 is a diagram illustrating the process of the present invention.

It has now been found that by modifying the conventional process for making carbon pellets, an ink product can be obtained directly. The process, as illustrated in FIG. 2, is as follows: residual liquid hydrocarbon feedstock from refinery operations is charged into a refractory chamber 11 maintained at about 2400° to 2900° F.; it is atomized and the decomposition products react with oxygen and heat as in the conventional process. Instead of using water to cool the gas stream down to below reaction temperature, this process uses make oil to achieve this result. It has the double benefit of reducing the entire volume of gas to be processed and eliminating the problem of contaminated carbon from the dissolved salts which are produced when water is used as the cooling medium. Following this initial cooling, the gas stream is further cooled by passing it through a series of air-to-gas and gas-to-gas heat exchangers 12. This cools the gases down to a point where an effective separation of carbon from the gas stream can be effected with bag filters 13. The gas stream, now free of carbon, is introduced into a gas-to-gas heat exchanger so that the sensible heat from the furnace off-gases can be recovered. In a companion air-to-gas heat exchanger, the gas stream is cooled further while simultaneously the air is heated and subsequently mixed with the heated gas and burned in a conventional boiler 15.

This very efficient utilization of by-product energy from the reaction is of major economic importance. The carbon black, which is still in its ultimate dispersed and non-agglomerated form, is introduced into a specially designed continuous-mixing device 14 and is combined with oils and/or varnishes to manufacture finished printing inks within seconds of its formation as elemental carbon. Dispersion of this ultra-fine carbon results in inks of superior quality.

The by-product heat and off-gases that contain combustible hydrocarbons, carbon dioxide, steam, and nitrogen can be recovered and utilized for heating or cooling purposes. Also they can be used to fuel a turbine-electric generator 16, thereby producing by-product electricity and an approximately 600° F. exhaust.

By the practice of this invention, major economies are effected. The recovered heat and off-gases can be used for heating and cooling purposes and for generating electricity. The cost of converting still bottoms, tarry residues, and other residual fluids continuously and directly into inks is considerably less than the cost of purchasing carbon in a grade sufficiently fine to be suitable for printing inks and then formulating it into such inks. The process is efficient also in that the carbon black can be made and immediately formulated into an ink in the locality where the ink is required. No separate grinding step is needed.

By varying the amount of ink vehicle and the amount and type of additives that are in the mixing device, inks can be obtained that have any desired pigment concentration and any desired rheological properties.

Although this invention has been illustrated by the manufacture of newspaper inks, it is not limited thereto. By using other oils, varnishes, and the like, the process can be used to produce other inks, e.g., heatset, letterpress, publication gravure, flexographic, etc.; paints; plastics; rubber; and so forth, where relatively small amounts of carbon are required and there is a need for heat and energy. It is also within the scope of this invention to produce other grades of carbon by varying the reactor design and operating conditions.

What is claimed is:

1. A direct process for producing printing inks from a hydrocarbon residue feedstock which comprises the steps of (1) charging the feedstock into a chamber where (a) it is atomized and (b) its decomposition products are reacted with oxygen and heat, (2) discharging the products of step (1) into a mixing device containing a liquid oil ink vehicle and additives, and (3) recovering the product.

2. The process of claim 1 wherein the vehicle is mineral oil and the product is a newspaper ink.

3. The process of claim 1 wherein the vehicle is heatset varnish and the product is heatset ink.

4. The process of claim 1 wherein the vehicle is gravure varnish and the product is gravure ink.

5. The process of claim 1 wherein the vehicle is flexographic varnish and the product is flexographic ink.

6. The process of claim 1 wherein the temperature of the chamber in step (1) is maintained at about 2400° to about 2900° F.

7. A printing ink prepared by the process of claim 1.
8. A printing ink prepared by the process of claim 2.
9. A printing ink prepared by the process of claim 3.
10. A printing ink prepared by the process of claim 4.
11. A printing ink prepared by the process of claim 5.
12. A printing ink prepared by the process of claim 6.

* * * * *